Oct. 31, 1967     E. L. HOWELL ET AL     3,350,017

STRAW CHOPPER AND SPREADER

Filed July 21, 1965     2 Sheets—Sheet 1

Inventors:
Elvin L. Howell
Charles M. Hyman

Inventors:
Elvin L. Howell
Charles M. Hyman

United States Patent Office 3,350,017
Patented Oct. 31, 1967

3,350,017
STRAW CHOPPER AND SPREADER
Elvin L. Howell, Bettendorf, and Charles M. Hyman, Davenport, Iowa, assignors to International Harvester Company, Chicago, Ill., a corporation of Delaware
Filed July 21, 1965, Ser. No. 473,653
4 Claims. (Cl. 239—660)

ABSTRACT OF THE DISCLOSURE

A straw chopper and spreader in which the chopper portion can be positioned relative to the rotor to accommodate the particular crop being harvested and the spreader portion is detachable and reversible to complement the position of the chopper portion.

This invention relates to an improved attachment for harvesting machines of the type known generally as combines and more particularly to an attachment for chopping and spreading upon the ground to restore to the soil straw, husks, corn cobs and other separated material not otherwise to be conserved.

An object of the invention is to provide such an attachment having selected high and low speeds of operation for different working conditions; e.g., 2700 r.p.m. rotor speed for the more readily severable matter such as the straw of cereals; 1000 r.p.m., for relative coarse matter such as corn husks, cobs, etc.

Another object of the invention is to provide such an attachment having an adjustable knife assembly, positionable relatively close to the rotor assembly for high speed operation; more removed for slower speed operation usual for corn and windrowing, and when desired retracted to and secured in inoperative position.

A further object of the invention is to provide such an attachment having knife assembly comprised of knives spring loaded and pivotal to allow passage of stones, roots and other coarse matter not readily susceptible of cutting, so as to avoid damage to the cutting elements.

An additional object of the invention is to provide such an attachment having a detachable and reversible spreader element or deflector plate to facilitate adaption of the device to a variety of working conditions and operations involving small grains, corn and windrowing, for example.

Other advantages and uses of the invention will be apparent from the description which follows.

Figure 1:
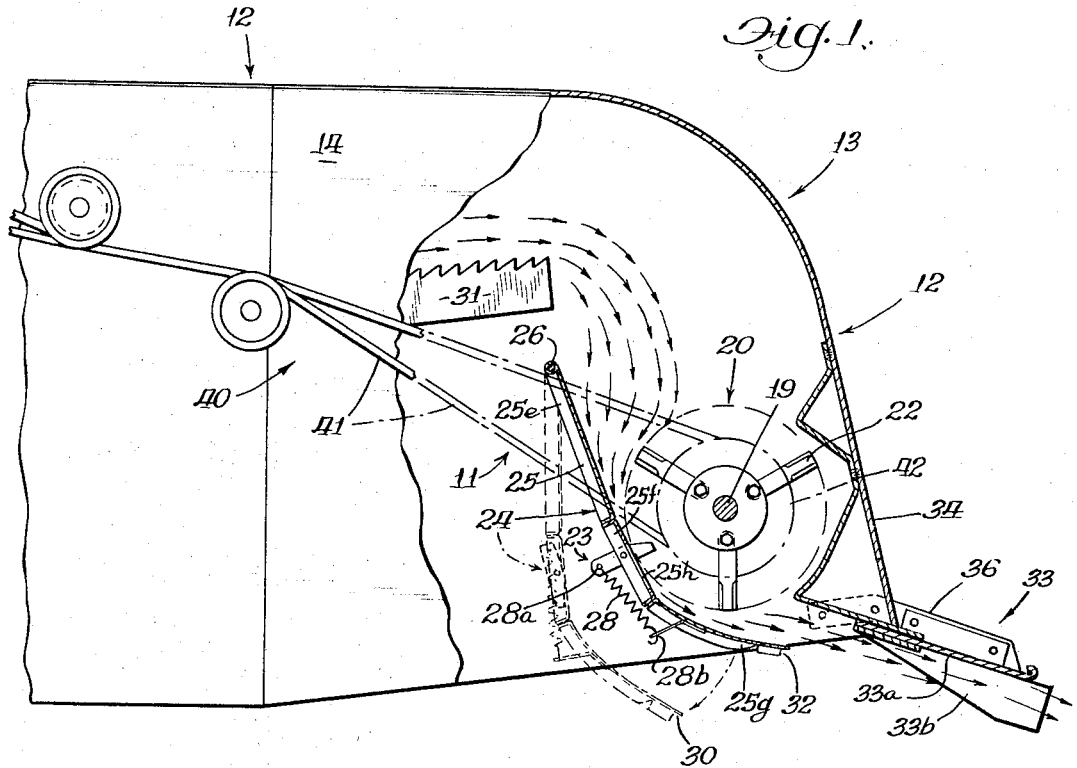
FIG. 1 is a schematic drawing of a fragmentary side elevation of an embodiment of the invention, partially broken away.
Figure 2:
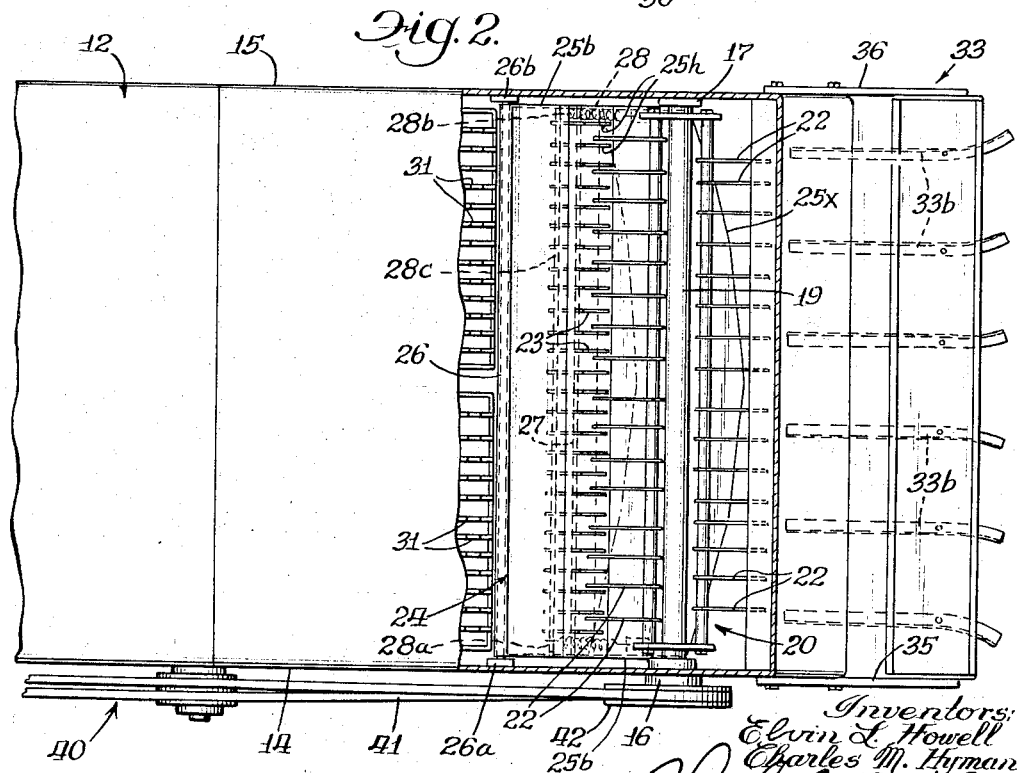
FIG. 2 is a plan view of the arrangement shown in FIG. 1.
Figure 5:
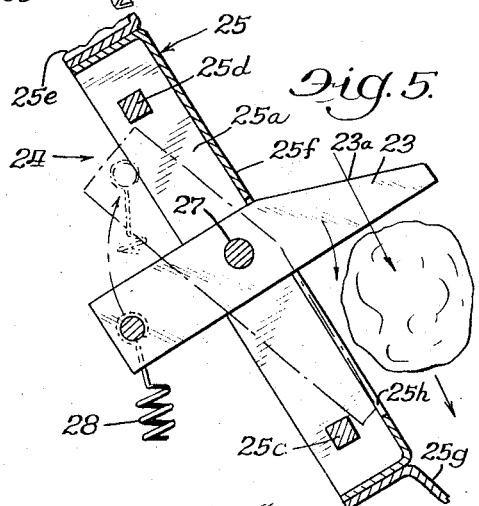
FIG. 5 is a detail enlargement of a portion of the embodiment of FIG. 1, in position of adjustment.

Referring to the drawings (FIGS. 1, 2, 5), the straw chopper and spreader attachment 11 is suitably mounted upon the rear end portion of a combine 12 of the type generally described in Adams Patent 2,708,582 of May 17, 1955. This attachment comprises a housing 13 having opposed sidewalls 14, 15, respectively supporting coaxial bearings 16, 17 arranged to receive for relative rotation opposed end portions of a generally horizontal shaft 19 of a chopping rotor 20.

Rotor 20 has a plurality of chopper blades 22 arranged thereon in fixed spaced relation circumferentially and longitudinally thereof and extending radially of shaft 19 for cooperation in chopping and cutting operation with a plurality of spring-loaded knives 23 of an adjustable knife assembly 24. Blades 22 and knives 23 preferably have hardened opposing edges, razor sharp.

Knife assembly 24 comprises a generally chute-like, concave upwardly supporting member 25 mounted adjacent one edge on and depending from a generallly horizontal shaft 26. Shaft 26 is rotatably supported at its opposite end portions 26a, 26b on sidewalls 14, 15 in predetermined generally parallel spaced relation with shaft 19. Shaft 26 is provided with manually operable means (not shown) for adjusting it and member 25 in selected positions of operation.

Supporting member 25, which extends transversely of the housing 13, has opposing flanges portions 25b, disposed in close spaced relation with side walls 14, 15 respectively, permitting pivotal movement of member 25 in a vertical plane upon rotative movement of shaft 26, and arranged to suppot opposing end portions of a generally horizontal rod 27 disposed in generally parallel spaced relation with shaft 19. Rod 27 is supported intermediately of its end portions by flanges 25a provided on member 25.

For convenience in manufacture the member 25 comprises a plurality of segments 25e, 25f, 25g having abutting flange portions welded together; the lowermost segment 25g terminating in a trailing edge 25x extending from one side wall 14 to the other 15. The trailing edge 25x is spaced further from shaft 26 at its mid-point than at its ends adjacent side walls 14 and 15. Knives 23 are mounted on rod 27 for relatively pivotal movement in a generally vertical plane and received in spaced slits 25h provided in member 25.

Knives 23 are biased in cutting position (with their cutting edges 23a disposed generally at right angles to member 25) by springs 28 secured at opposite ends 28a, 28b of a rod 28c extending through knives 23, and are arranged to yield under predetermined pressure to permit the knives to pivot (clockwise) to non-cutting position (dotted lines, FIG. 5) to allow the passage of coarse, hard, or other obstructive or injurious matter such as roots, stones, etc. Stops 25d, 25c on member 25 respectively limit pivotal movement of the knives.

Member 25, normally maintained in operative position with knives 23 in close interfitting relation with blades 22, as previously noted, is retractable by manually operable means (not shown) to an inoperative position of knives 23 (dotted lines, FIG. 1) upon rotation of shaft 26.

Rotor 20 and knife assembly 24, with their respective components, are arranged in cooperative interfitting chopping relation intermediately of the straw walkers or racks 31 and discharge outlet 32, and in operative position to intercept the flow of material from the racks 31 and subject it to vigorous chopping action in the course of which the blades 22 force the material against and between the knives 23 and discharge it at high velocity to the spreader 33.

Spreader 33 which comprises a portion of a flat baffle or deflector plate 33a with a plurality of rearwardly flaring or diverging vanes 33b depending therefrom, is disposed above and extends outwardly beyond the discharge outlet 32, transversely thereof and adjacent the rear end wall 34 of housing 13, being supported adjacent opposed edges thereof on sidewalls 14, 15, respectively, by means of brackets 35, 36.

Spreader 33 and its components are arranged to strew the discharged material on the ground rearwardly of the moving combine in a path suitable for restoration of the material to the soil.

Rotor 20 is operated by a power take-off 40 from the power system of the combine 12 connected by means of belt 41 associated with sheave 42 mounted on shaft 19 for rotation therewith at speed preferably of the order of 2700 r.p.m. when operating on relatively lightweight materials such as the straws of oats, wheat, rye.

Figure 3:
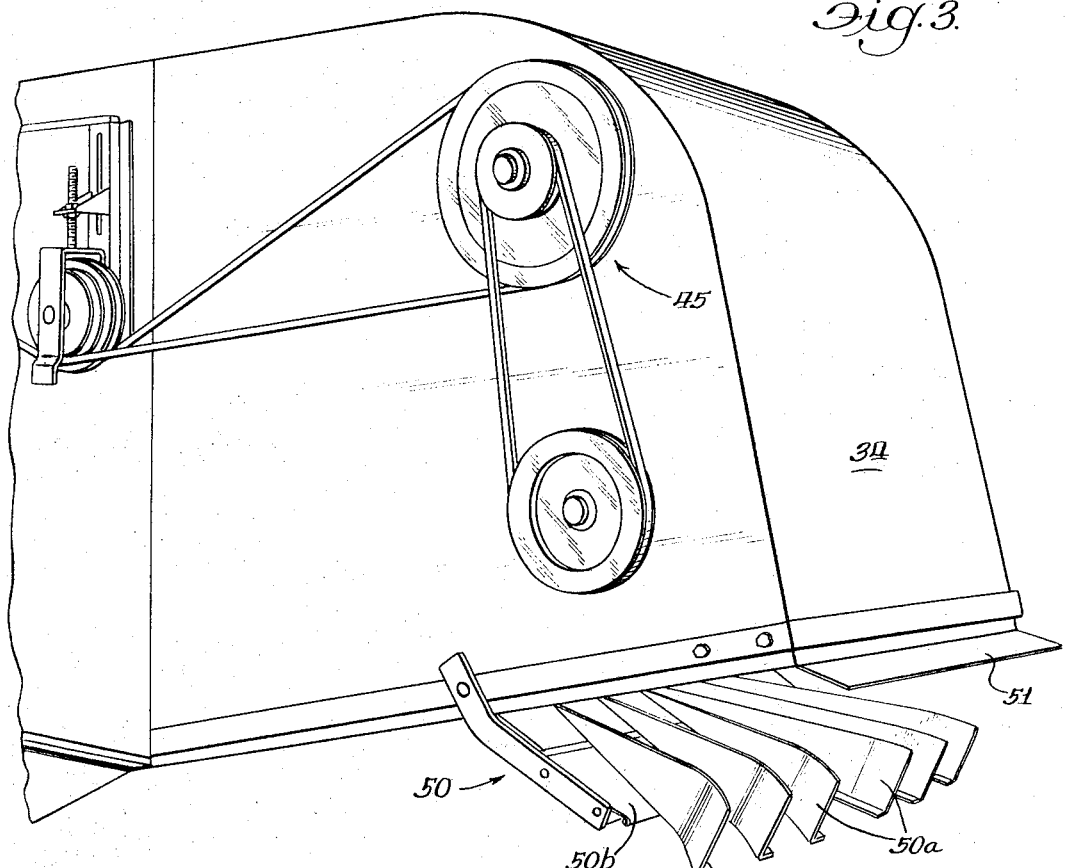
FIG. 3 is a fragmentary schematic drawing in perspective of a modification of the invention illustrated in FIG. 1.
Figure 4:
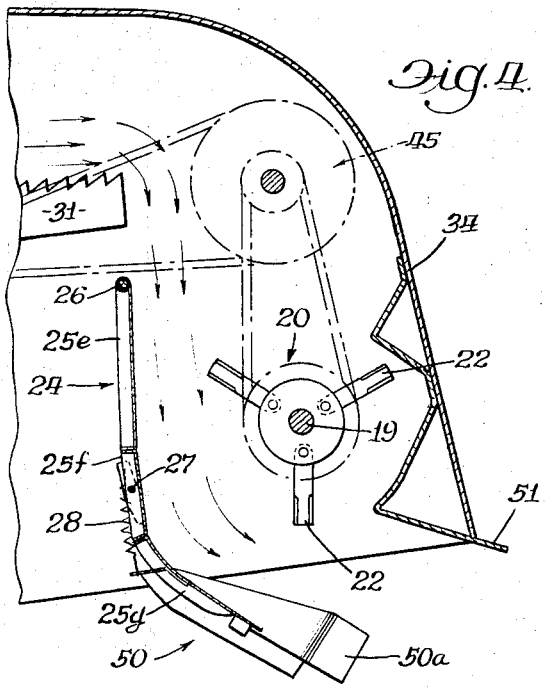
FIG. 4 is a fragmentary schematic drawing of a vertical section of the modification illustrated in FIG. 3.

When operating in corn a slower rotor speed is desirable, preferably of the order of 1000 r.p.m. This may be obtained by the inclusion of power reduction means 45 illustrated in FIGS. 3, 4, in the power train.

When operating in corn, and in windrowing instead of spreading as above described, it may be desirable to secure knife assembly 24 in retracted position (FIG. 4); also a modified form of spreader or windrower 50 (FIGS. 3, 4)—which may be generally a reversal of spreader 33—is preferred. In this form the vanes 50a are arranged atop the deflector plate 50b, which is disposed forwardly of the discharge outlet 32, and a canopy 51 supported by the housing 13 surmounts the vanes.

By way of summary, straw discharged by the combine passes rearwardly and downwardly into contact with blades 22 of rotor 20 (rotating counterclockwise at high speed) and closely interfitting knives 23 and is then discharged therebeyond upon deflector portion of member 25 to the spreader 33 and the discharge outlet 32. When working in corn or windrowing, member 25 is retracted and knives 23 withdrawn from close interfitting relation with blades 22 and the chopped material over the reversed spreader 50 and beneath canopy 51.

It will be understood that the invention is not limited to the structure which has been illustrated and described and that there may be various departures therefrom within the scope of the claims which follow.

I claim:

1. A straw chopper and spreader attachment for a combine, comprising
   (a) a supporting structure including a housing having opposed sidewalls interconnected by a generally arcuate top and rear end wall, and a bottom terminating in a discharge outlet adjacent said end wall,
   (b) a chopper rotor having a generally horizontal central shaft extending transversely of said housing and supported adjacent its opposed end portions on said sidewalls for rotation about said axis,
   (c) said rotor comprising a plurality of chopper blades mounted thereon for rotation therewith, said blades extending radially of said shaft and being disposed thereon in longitudinally and circumferentially spaced relation with one another,
   (d) a knife assembly comprising
      a second shaft having a generally horizontal longitudinal axis transversely of said housing in parallel spaced relation with the shaft of said rotor, and having its opposed end portions supported on said sidewalls for relative rotation,
      a generally arcuate knife supporting member mounted adjacent one end thereof on said second shaft for pivotal movement in a generally vertical plane,
      said knife supporting members terminating in a straw deflector having a trailing edge having ends adjacent said side walls, said trailing edge being spaced further from said second shaft at its mid-point than at its ends,
      said knife supporting member being adjustable to selected operative and inoperative positions in relation to said blades,
      a plurality of knives mounted on said member for pivotal movement about a generally horizontal axis disposed in predetermined spaced relation with said second shaft, said knives being spring biased in cutting position with their cutting edges generally at right angles to said knife supporting member,
   said second shaft, said knife supporting member and said knives being so conformed and arranged to operate that upon rotation of said second shaft about its said axis in one direction to a predetermined position of adjustment said knives are supported in close interfitting cutting relation with said blades, and upon rotation of said second shaft in an opposite direction said knives are removed correspondingly in relation to said blades,
   means on said rotor shaft in operative communication with the power system of the combine for rotating said rotor shaft at predetermined speed under operator control,
   said rotor and said knife assembly being operatively positioned in the discharge path of straw issuing from the combine whereby upon said rotor shaft being rotated at appropriate speed and said knives being supported in operative cutting relation with said blades, the straw will be subjected to cooperative cutting action by the cutting edges of said blades and said knives and passed therebetween and discharged through said outlet.

2. An attachment according to claim 1 in which a straw spreader is arranged in cooperative relation with the deflector of said knife supporting member, said spreader comprising a plurality of opposed sets of rearwardly flaring and diverging vanes arranged to strew straw discharged thereto in a desired path rearwardly of the combine.

3. An attachment according to claim 1 including
   spring means associated with said supporting member and biasing said knives in operative cutting position at right angles to said knife supporting member,
   said spring being arranged to yield at a predetermined overload due to clogging, and the presence of obstructive matter, to enable the knives individually to pivot out of cutting relation with their associated blades, and
   means on said knife supporting member enabling said knives so to pivot.

4. A straw chopper and spreader attachment for a combine, comprising:
   a supporting structure including a housing having opposed sidewalls interconnected by a generally arcuate top and rear end wall, and a bottom terminating in a discharge outlet adjacent said end wall;
   a chopper rotor having a generally horizontal central shaft extending transversely of said housing and supported adjacent its opposed end portions on said sidewalls for rotation about said axis,
   said rotor comprising a plurality of chopper blades mounted thereon for rotation therewith, said blades extending radially of said shaft and being disposed thereon in longitudinally and circumferentially spaced relation with one another;
   a knife asembly comprising
      a second shaft having a generally horizontal longitudinal axis transversely of said housing in parallel spaced relation with the shaft of said rotor, and having its opposed end portion supported on said sidewalls for relative rotation,
      a generally arcuate knife supporting member mounted adjacent one end thereof on said second shaft for pivotal movement is a generally vertical plane,
      said generally arcuate knife supporting member having peripheral flange portions in close spaced relation with the sidewalls of the housing,
      a rod in parallel spaced relation with said second shaft and having end portions supported on said flanges portions, a plurality of knives supported on said rod for pivotal movement in a vertical plane, openings in said supporting member for receiving said knives and enabling such pivotal movement of them, spring means associated with said supporting member and said knives such that the knives are biased into operative position generally at right angles to said supporting member, and can pivotally yield to an inoperative position when overloaded to relieve such condition, and stops on said supporting member limiting such pivotal movement of said knives;

said second shaft, said knife supporting member and said knives being so conformed and arranged to operate that upon rotation of said second shaft about its axis in one direction to a predetermined position of adjustment said knives are supported in close interfitting cutting relation with said blades, and upon rotation of said second shaft in an opposite direction said knives are removed correspondingly in relation to said blades;

means on said rotor shaft in operative communication with the power system of the combine for rotating said rotor shaft at predetermined speed under operator control;

said rotor and said knife assembly being operatively positioned in the discharge path of straw issuing from the combine whereby upon said rotor shaft being rotated at appropriate speed and said knives being supported in operative cutting relation with said blades, the straw will be subjected to cooperative cutting action by the cutting edges of said blades and said knives and passed therebetween and discharged through said outlet; and said spreader being detachable and reversible whereby in one position it functions to strew the straw in a desired path upwardly and rearwardly of the combine in cooperation with a canopy arranged in predetermined spaced relation surmounting the spreader to restrict further upward movement of the straw.

References Cited

UNITED STATES PATENTS

| | | | |
|---|---|---|---|
| 2,554,669 | 5/1951 | Elofson | 275—3 |
| 2,626,159 | 1/1953 | Thompson | 275—3 |
| 2,708,582 | 5/1955 | Adams | 275—3 |
| 2,754,126 | 7/1956 | Aune | 275—3 |
| 3,005,637 | 10/1961 | Heteen | 275—3 |
| 3,256,026 | 6/1966 | Elofson | 275—3 |

ABRAHAM G. STONE, *Primary Examiner.*

J. R. OAKS, *Assistant Examiner.*